United States Patent
Ishihara et al.

(10) Patent No.: US 8,977,635 B2
(45) Date of Patent: Mar. 10, 2015

(54) DEVICE, METHOD OF PROCESSING DATA, AND COMPUTER-READABLE RECORDING MEDIUM

(71) Applicant: Fujitsu Limited, Kawasaki-shi, Kanagawa (JP)

(72) Inventors: Mamoru Ishihara, Shizuoka (JP); Hideaki Tanaka, Kawasaki (JP); Yoshinori Arai, Kawasaki (JP); Kazuhisa Tanimoto, Nishinomiya (JP)

(73) Assignee: Fujitsu Limited, Kawasaki (JP)

( * ) Notice: Subject to any disclaimer, the term of this patent is extended or adjusted under 35 U.S.C. 154(b) by 241 days.

(21) Appl. No.: 13/798,626

(22) Filed: Mar. 13, 2013

(65) Prior Publication Data
US 2013/0246444 A1   Sep. 19, 2013

(30) Foreign Application Priority Data
Mar. 14, 2012   (JP) ................. 2012-057545

(51) Int. Cl.
G06F 17/30   (2006.01)

(52) U.S. Cl.
CPC .............................. G06F 17/30569 (2013.01)
USPC ........................................ 707/755; 707/802

(58) Field of Classification Search
CPC .................. G06F 17/30286; Y10S 707/99941
USPC ................................................. 707/755, 802
See application file for complete search history.

(56) References Cited

U.S. PATENT DOCUMENTS 5,634,123 A * 5/1997 Bennion .............................. 1/1
7,783,655 B2 * 8/2010 Barabas et al. ............... 707/758

FOREIGN PATENT DOCUMENTS

| JP | 6-203020 | 7/1994 |
| JP | 10-21249 | 1/1998 |
| JP | 2011-170546 | 9/2011 |

* cited by examiner

*Primary Examiner* — Cheryl Lewis
(74) *Attorney, Agent, or Firm* — Staas & Halsey LLP

(57) ABSTRACT

A device includes a memory configured to store a program; and a processor coupled to the memory and configured to execute a process based on the program. The process includes: for input data made of a combination of pieces of unit data and including a plurality of consecutive records each including data of a plurality of items, when a sequence of type information indicating a kind of each piece of the unit data in the input data is divided into partial sequences each having a certain length, analyzing a break position of the records in the input data by determining, as a length of each of the records, the length of each of the partial sequences when sequences of type information in all the partial sequences correspond to each other.

17 Claims, 16 Drawing Sheets

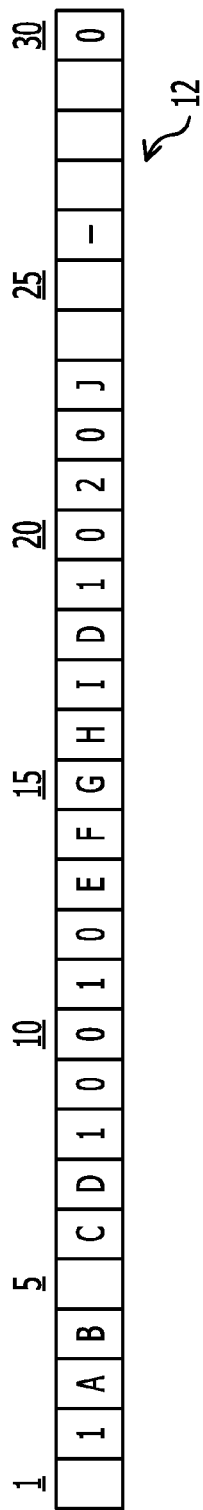

FIG. 6A

|   | 1 | 5 |   |   |   |   | 10 |   |
|---|---|---|---|---|---|---|----|---|
|   | 1 | A | B |   | C | D | 1  | 0 | 0 | ← 12B-1
| 1 | 0 | E | F | G | H | I | D  | 1 | 0 | ← 12B-2
| 2 | 0 | J |   |   | – |   |    |   | 0 | ← 12B-3

FIG. 6B

|   | 1 | 5 |   |   |   |   | 10 |   |
|---|---|---|---|---|---|---|----|---|
| s | n | s |   |   |   |   |    | n | ← 12b-1
|   | n | s |   |   |   |   |    | n | ← 12b-2
|   | n | s |   |   |   |   |    | n | ← 12b-3

FIG. 7A

| | 1 | A | B | |
|---|---|---|---|---|
| C | D | 1 | 0 | 0 |
| 1 | 0 | E | F | G |
| H | I | D | 1 | 0 |
| 2 | 0 | J | | |
| – | | | | 0 |

| s | n | s | | |
|---|---|---|---|---|
| s | | | | n |
| | | n | s | |
| s | | | | n |
| | | n | s | |
| s | | | | n |

|   | 1 |   |   |   | 5 |   |   |   |   | 10 |   |
|---|---|---|---|---|---|---|---|---|---|----|---|
|   | 1 | A | B |   | C | D | 1 | 0 | 0 | ← 12B-1 |
| 1 | 0 | E | F | G | H | I | D | 1 | 0 | ← 12B-2 | } 12
| 2 | 0 | J |   |   | — |   |   |   | 0 | ← 12B-3 |

FIG. 11B

|   | 1 |   |   | 5 |   |   |   | 10 |   |
|---|---|---|---|---|---|---|---|----|---|
| n | n | s | s | s | s | s | n | n  | ← 12D |
| P | — | — | P | P | — | P | P | P | — | ← 12E |

NUMERIC (2)  CHARACTER STRING (3)  CHARACTER STRING (3)  NUMERIC (2)

FIG. 14A
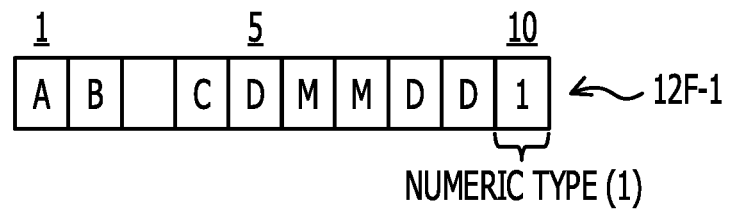
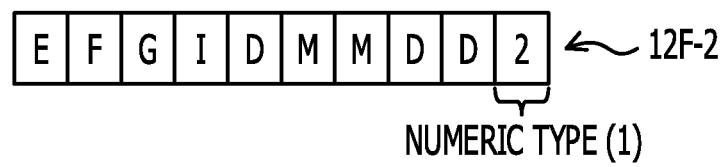
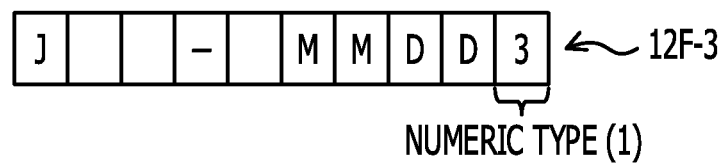
FIG. 14B
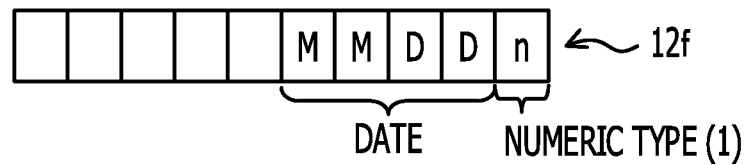

DEVICE, METHOD OF PROCESSING DATA, AND COMPUTER-READABLE RECORDING MEDIUM

CROSS-REFERENCE TO RELATED APPLICATION

This application is based upon and claims the benefit of priority of the prior Japanese Patent Application No. 2012-057545, filed on Mar. 14, 2012, the entire contents of which are incorporated herein by reference.

FIELD

The embodiment discussed herein is related to a device, a method of processing data, and a computer-readable recording medium storing a program.

BACKGROUND

Some pieces of input data and output data for use by computer systems include a plurality of records each including data of a plurality of items. A typical example is data used by computer systems including database devices, for example. Data used by a database device is, in general, defined for each computer system including a database device. In order to transmit and receive data between computer systems which differ in data definition, processing of converting output data of one computer system into input data of the other computer system has to be performed. For this purpose, the definition of output data of one computer system has to be associated with the definition of input data of the other computer system. For example, definitions of input data formats (e.g., an input format) definitions of output data formats (e.g., an output format), and definitions of methods (mapping) of converting positions and orders are, in general, manually created.

In contrast, for example, a technique which recognizes the text format of a formatted text file including a linefeed character or a specific character, which is a technique for defining data, is known. In this technique, the text format of a text file which has been text-formatted with a header, footer, multiple columns, chart allocation, and the like on a page. More particularly, a plurality of lines are compared and the page length is estimated. A range of successive identical, specific characters, such as successive blank characters, is recognized to be a boundary between paragraphs, and a line which is not a text and for which processing is unnecessary, as in a chart region, is recognized.

There is also known a technique which, in order to convert a non-structured document into a structured document, extracts from a non-structured document a characteristic character string representing a component of a logical structure of the document used when the non-structured document is converted into a structure document. In this technique, a characteristic character string representing a component of a logical structure of non-structured document is extracted from the document, and the non-structured document is converted into a structured document by using the extracted character string.

Also, a technique in which, in order to determine an item in a document generating program, when a first character string included in a first document includes a character string related to a second character string, the second character string is determined as an item. In this technique, a text is extracted from an image of a card or the like in which a specific character is contained, and, for the extracted text, an item is determined on the basis of the specific character.

By the way, fixed-length data including a plurality of items whose data length and data type are predetermined is known as an example of data for use by a computer system including a database device. In fixed-length data, although the data length and data type of each of a plurality of items are predetermined, there is no break for each item and data is uninterrupted. Therefore, it is difficult to apply techniques which use a text or document including a linefeed character or a specific character as input data to fixed-length data. Accordingly, definition of items and the like has been made manually in order to use fixed-length data in other computer systems which differ in definition from the original computer system. That is, in order to use fixed-length data in other computer systems, the format of fixed-length data (e.g., output format) has to be manually defined.

Japanese Laid-open Patent Publication No. 6-203020, Japanese Laid-open Patent Publication No. 10-21249, and Japanese Laid-open Patent Publication No. 2011-170546 are known as examples of the related art.

SUMMARY

According to an aspect of the invention, a device includes a memory configured to store a program; and a processor coupled to the memory and configured to execute a process based on the program. The process includes: for input data made of a combination of pieces of unit data and including a plurality of consecutive records each including data of a plurality of items, when a sequence of type information indicating a kind of each piece of the unit data in the input data is divided into partial sequences each having a certain length, analyzing a break position of the records in the input data by determining, as a length of each of the records, the length of each of the partial sequences when sequences of type information in all the partial sequences correspond to each other.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5A is a conceptual image illustrating example fixed-length data;

FIG. 5B is a conceptual image illustrating data divided by a divisor;

FIG. 5C is a conceptual image illustrating a partial sequence for divided data;

FIG. 6A is a conceptual image illustrating data into which fixed-length data is divided by a divisor;

FIG. 6B is a conceptual image illustrating a partial sequence;

FIG. 7A is a conceptual image illustrating data into which the fixed-length data is divided by a divisor;

FIG. 7B is a conceptual image illustrating a partial sequence;

FIG. 11A and FIG. 11B are explanatory illustrations for a process of the first assuming processing in the third analyzing unit;

FIG. 14A and FIG. 14B are explanatory illustrations for the second assuming processing in the third analyzing unit;

DESCRIPTION OF EMBODIMENT

Hereinafter, an example embodiment of the disclosed technique will be described in detail with reference to the drawings.

(Data Analysis System)

Figure 1:
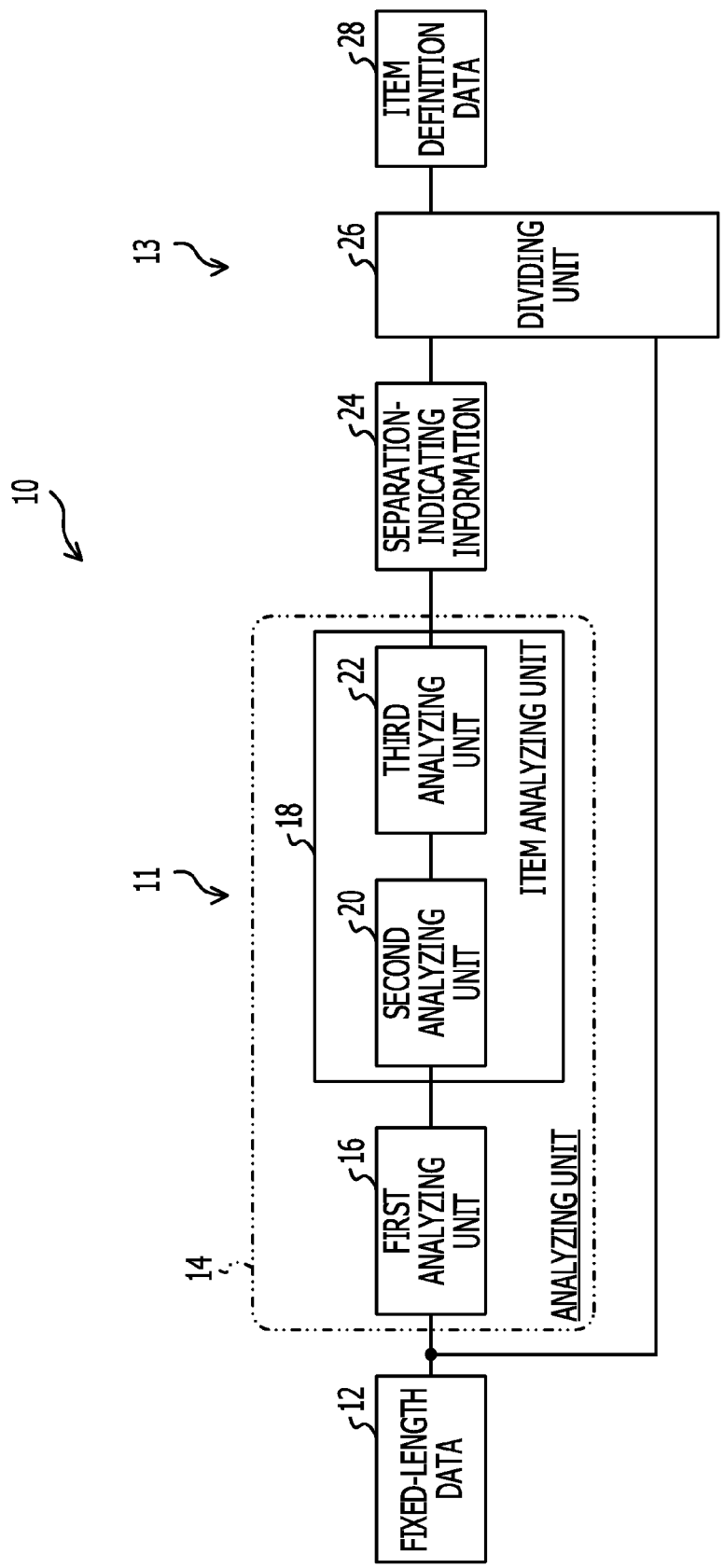
FIG. 1 is a block diagram illustrating a schematic configuration of a data analysis system according to this embodiment.

FIG. 1 illustrates a data analysis system 10 according to this embodiment to be implemented by a computer. The data analysis system 10 includes a data analysis device 11 which at least includes an analyzing unit 14, and a data dividing device 13 which includes a dividing unit 26. The analyzing unit 14 of the data analysis device 11 includes a first analyzing unit 16, and an item analyzing unit 18 including a second analyzing unit 20 and a third analyzing unit 22. Fixed-length data 12, in which data of a plurality of items is arranged in a consecutive manner without a delimiter, is input to the analyzing unit 14. The analyzing unit 14 analyzes the input fixed-length data 12 and outputs information 24 indicating a break of data of each item (hereinafter referred to as "break-indicating information"). The break-indicating information 24 output from the analyzing unit 14 and the fixed-length data 12 are input to the dividing unit 26 of the data dividing device 13. The dividing unit 26 divides the fixed-length data 12 on the basis of the break-indicating information 24, and outputs it as item definition data 28.

Figure 2:
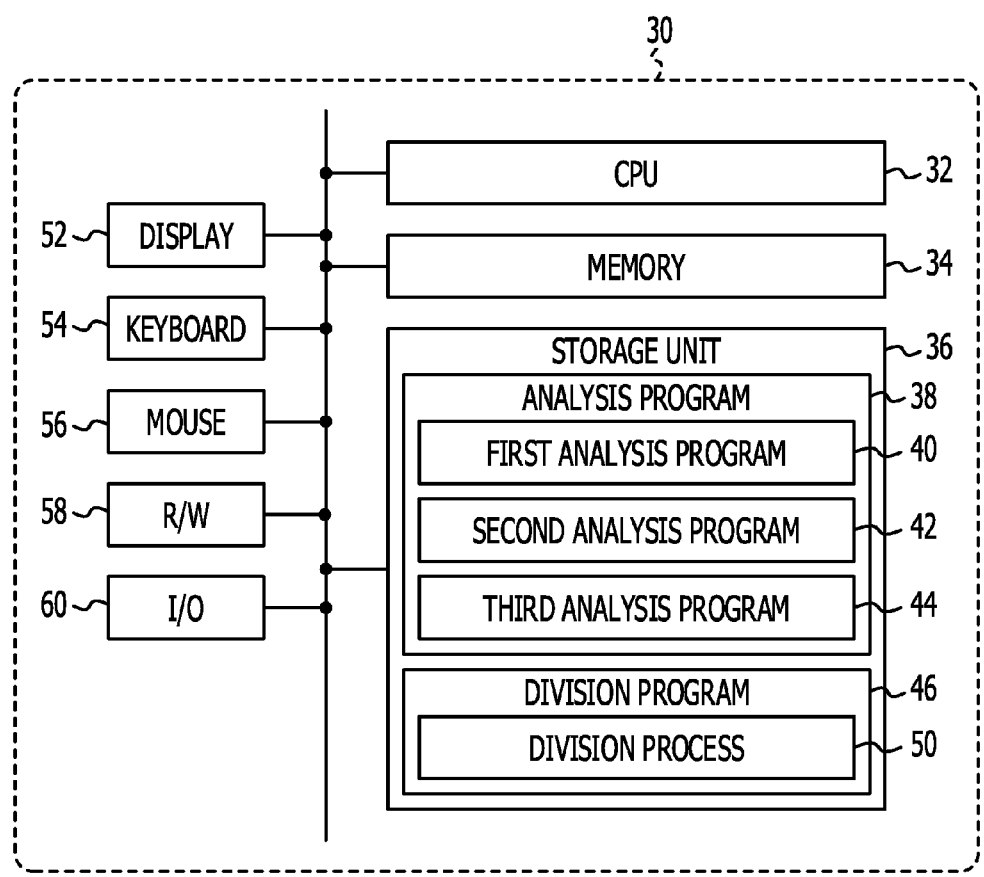
FIG. 2 is a schematic block diagram of the data analysis system according to this embodiment.

The data analysis system 10 is implemented by a computer 30 illustrated in FIG. 2, for example. The computer 30 includes a central processing unit (CPU) 32, a memory 34, a nonvolatile storage unit 36, a display 52, a keyboard 54, and a mouse 56, and these components are mutually coupled via a bus 62. The computer 30 also includes an interface (I/O) 60 for coupling to communication lines, such as the Internet, and a device (R/W) 58 for reading from and writing to an inserted recording medium, and these are coupled to the bus 62. Note that the storage unit 36 is implemented by a hard disk drive (HDD), flash memory, or the like.

An analysis program 38 for causing the computer 30 to function as the data analysis device 11 is stored in the storage unit 36. A division program 46 for causing the computer 30 to function as the data dividing device 13 is stored in the storage unit 36. The CPU 32 reads the analysis program 38 from the storage unit 36, loads it into the memory 34, and sequentially executes processes which the analysis program 38 has. The CPU 32 reads the division program 46 from the storage unit 36, loads it into the memory 34, and sequentially executes processes which the division program 46 has.

Note that although this embodiment illustrates an example in which each of the data analysis device 11 and the data dividing device 13 is implemented by the computer 30, the data analysis device 11 and the data dividing device 13 are not limited to as being included in one computer. That is, the data analysis device 11 and the data dividing device 13 in the techniques of this disclosure may be implemented by independent computers, respectively. In this case, data is transmitted and received between the computer which functions as the data analysis device 11 and the computer which functions as the data dividing device 13 by using the R/W 58 or the I/O 60.

The analysis program 38 includes a first analysis process 40, a second analysis process 42, and a third analysis process 44. The CPU 32 operates as the first analyzing unit 16 of the data analysis device 11 illustrated in FIG. 1 by executing the first analysis process 40. That is, the data analysis device 11 included in the data analysis system 10 is implemented by the computer 30, and the computer 30 operates as the first analyzing unit 16 by executing the first analysis process 40. The CPU 32 also operates as the second analyzing unit 20 illustrated in FIG. 1 by executing the second analysis process 42. The CPU 32 also operates as the third analyzing unit 22 illustrated in FIG. 1 by executing the third analysis process 44. The CPU 32 also operates as the item analyzing unit 18 illustrated in FIG. 1 by executing the second analysis process 42 and the third analysis process 44.

Note that the analysis program 38 is an example of the data analysis program in the techniques of this disclosure. That is, the analysis program 38 is an example of the data analysis program for causing the computer 30 to function as the data analysis device 11.

The division program 46 includes a division process 50. The CPU 32 operates as the dividing unit 26 of the data dividing device 13 illustrated in FIG. 1 by executing the division process 50. That is, the data dividing device 13 included in the data analysis system 10 is implemented by the computer 30, and the computer 30 operates as the dividing unit 26 by executing the division process 50.

Note that the division program 46 is an example of a data division program in the techniques of this disclosure. That is, the division program 46 is an example of the data division program for causing the computer 30 to function as the data dividing device 13.

The data analysis device 11 analyzes input fixed-length data 12. A plurality of pieces of data of different formats are examples of the data for use by a computer. For example, data in an Extensible Markup Language (XML) format is data in which items are explicitly segmented by tags. Data in a comma separated values (CSV) format of another example is data in which items are explicitly segmented by given marks such as commas. In contrast, the fixed-length data 12 is data having a plurality of items each having a fixed length and type. That is, since there is no break of an item in the fixed-length data 12, it is difficult to determine that one item extends from where to where in the data. When a plurality of consecutive items constitutes one record, a plurality of records are uninterrupted, without a break. Accordingly, since the fixed-length data 12 includes no break of an item, it is difficult to determine that one record extends from where to where in the data. From the fixed-length data 12 in a format without a break, the data analysis device 11 automatically analyzes the break of an item.

First, the first analyzing unit 16 of the data analysis device 11 analyzes the fixed-length data 12, and determines the break positions of records in the fixed-length data 12 on the basis of kind of character, or the like. The item analyzing unit 18 determines the break positions of items for one record analyzed by the first analyzing unit 16. More particularly, the second analyzing unit 20 finds a padding character which follows a character or number, and the third analyzing unit 22 determines the break positions of items in one record in the fixed-length data 12 on the basis of a padding character, the kind of a character, or the like.

Based on the information 24 indicating the break positions of records in the fixed-length data 12 and the break positions of items of one record analyzed in the data analysis device 11, the data dividing device 13 divides the fixed-length data 12 for each item, thereby obtaining the item definition data 28. More particularly, the break-indicating information 24 output from the analyzing unit 14 and the fixed-length data 12 are input to the dividing unit 26 of the data dividing device 13. The dividing unit 26 outputs the item definition data 28 obtained by dividing the input fixed-length data 12 for each item using the break-indicating information 24.

Note that an aspect in which the analysis program 38 and the division program 46 are stored in advance in the storage unit 36 of the computer 30 will be described in this embodiment. However, the analysis program 38 and the division program 46 may be received by way of communication from an external information processing apparatus and stored in the memory 34, for example. The analysis program 38 and the division program 46 are not limited to being collectively stored in the storage unit 36 or the memory 34. For example, the analysis program 38 and the division program 46 may be stored in the storage unit in such a manner that they are divided into individual programs and processes, and may also be stored in such a manner as to be distributed over computer networks, such as the Internet.

Then, operations of this embodiment will be described. First, with reference to FIG. 3 to FIG. 15, an analysis process which determines information indicating a break of the fixed-length data 12 implemented by the data analysis device 11 of the data analysis system 10.

Figure 3:
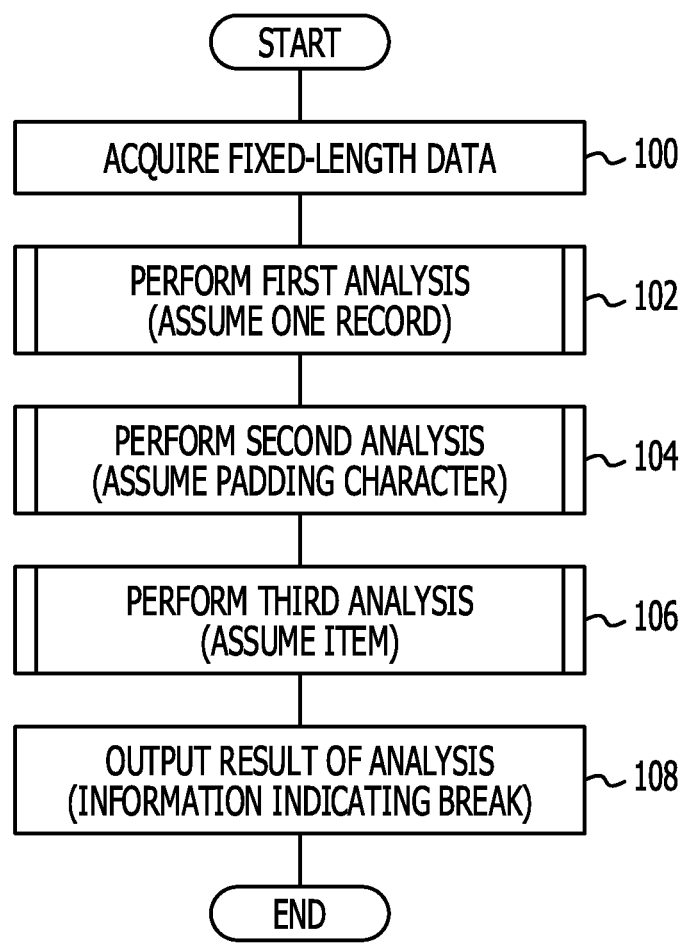
FIG. 3 is a flowchart illustrating an example flow of an analysis process of a data analysis device according to this embodiment.

In the analysis process performed by the data analysis device 11, a processing routine illustrated in FIG. 3 is executed. First, in operation 100, the analyzing unit 14 acquires the fixed-length data 12, which is a subject of the data analysis specified by a user's instruction. The fixed-length data 12 is data which includes a plurality of items each having a fixed length and type in a consecutive manner without including a special character, such as a delimiter. Next, in operation 102, the first analyzing unit 16 assumes one record length by using the acquired fixed-length data 12.

In this embodiment, for example, text data is adopted as the fixed-length data 12, the details of which will be described below. The first analyzing unit 16 converts text data as the fixed-length data 12 into the kind of character representing whether data of each character included in the text data is data representing a character other than a number or data representing a number. In accordance with the sequence of converted kinds of characters, the first analyzing unit 16 determines the start position of a character string pattern of consecutive pieces of data representing a character and the end position of a numeric character string pattern of consecutive pieces of data representing a number. Then, the first analyzing unit 16 estimates that the length of data in which the start position of a character string pattern and the end position of a numeric character string pattern match among all records or the degree of matching is equal to or larger than a predetermined threshold would be one record length. Note that, in this case, all the record lengths are preferably identical. The start position of a character string pattern and the end position of a numeric character string pattern may be the reverse thereof, that is, the end position of the character string pattern and the start position of the numeric character string pattern.

Next, in operation 104, the second analyzing unit 20 of the item analyzing unit 18 assumes a padding character in the fixed-length data 12. In the case where consecutive identical characters are provided either before or after a numeric character string, the second analyzing unit 20 assumes the consecutive characters to be padding characters of the numeric character string, as will be described in more detail hereinafter. Also, in the case where consecutive identical characters are provided either before or after a character string, the second analyzing unit 20 assumes the consecutive characters to be padding characters of the character string.

Next, in operation 106, the third analyzing unit 22 of the item analyzing unit 18 assumes the break position of an item in the fixed-length data 12 using one record length assumed in the first analyzing unit 16 and the padding character assumed in the second analyzing unit 20. The third analyzing unit 22 assumes the break positions of items using the following assuming methods, the details of which will be described hereinafter. A first assuming method determines the kind of a character at each position in a record, and assumes the boundary between characters of different kinds which is common to all the records as the break position of an item. A second assuming method assumes the break position of an item from a predefined sequence of kinds of characters. For example, the second assuming method determines a pattern which matches a sequence of numbers or the degree of matching is equal to or larger than a predetermined threshold, and when the pattern appears in all the records, the second assuming method assumes the pattern as an item and assumes the position of either before or after the pattern as the break position of the item.

Next, in operation 108, the analyzing unit 14 outputs the break-indicating information 24 as a result of analysis. The break-indicating information 24 includes one record length, the position of a boundary between records determined from one record length, the length of each item (item length) included in one record, the kinds of characters of each item, and a break position of each item.

As such, regarding the fixed-length data having a plurality of items each having a fixed length and type, break positions of items are automatically determined and the start position and length of each item are assumed. This reduces the time and effort taken for manually input the start position and length of each item included in the fixed-length data to a computer.

Figure 4:
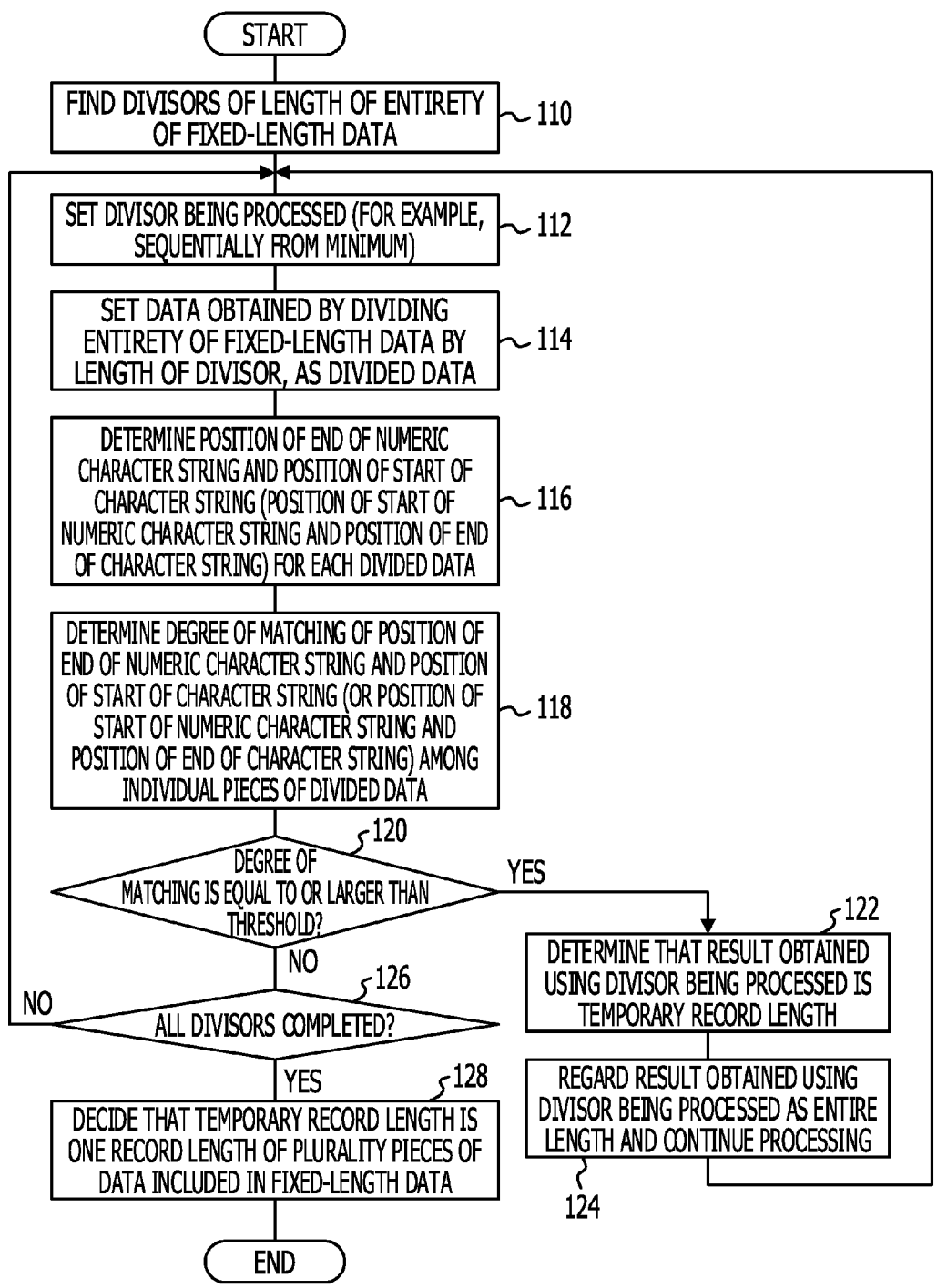
FIG. 4 is a flowchart illustrating an example flow of processing in a first analyzing unit.

In the first analysis process of operation 102 performed by the first analyzing unit 16, a processing routine of FIG. 4 is executed. In this embodiment, the case where the fixed-length data 12 is text data including data representing a character other than a number and data representing a number will be described by way of example. That is, in this embodiment, a description will be given of fixed-length data including a character string of a character type and a numeric character string of a numeric value type.

The first analyzing unit 16 determines the start position of a character string including at least one piece of data representing a character other than a number, and the end position of a numeric character string including at least one piece of data representing a number. The start position of a character string and the end position of a numeric character string are similar among all the records included in the fixed-length data. Accordingly, then, the length of one record is determined so that intervals between the start positions of character strings and the end positions of numeric character strings form a regular, iterative pattern. That is, the length of one record which allows the start positions of character strings and the end positions of numeric character strings to be cyclically located in the fixed-length data is determined. Here, if all the record lengths are the same, the length of one record is a divisor of all the record lengths. Accordingly, in this embodiment, an example in which the first analyzing unit 16 estimates the length of one record using a divisor of all the record lengths will be described in detail.

In operation 110 of FIG. 4, the first analyzing unit 16 identifies the length (character length) of the entirety of the fixed-length data 12 acquired in operation 100, and finds divisors of the length of the entirety of the fixed-length data 12. Next, in operation 112, the first analyzing unit 16 sets a divisor being processed from among divisors found in operation 110 except for 1 and a divisor which matches the length of the entirety of the fixed-length data 12. In this embodiment, the case where the divisor being processed is set sequentially from the minimum divisor will be described.

Next, in operation 114, the first analyzing unit 16 divides the entirety of fixed-length data into pieces of data by a length obtained as a result (the number of characters) of dividing the number of characters of the entirety of fixed-length data by the divisor being processed set in operation 112, and sets the pieces of data as divided data.

Next, in operation 116, the first analyzing unit 16 determines the end position of a numeric character string and the start position of a character string for each divided data set in operation 114. In this case, the end position of a numeric character string and the start position of a character string are determined by setting one character of fixed-length data as a predetermined unit character and converting each unit character into type information indicating the type of the unit character. That is, the fixed-length data is input data in which a plurality of consecutive records including data of a plurality of items are included. When one character of the fixed-length data is set as a predetermined unit character, and type information indicating the kind of the unit character is arranged for each unit character, a partial sequence, which is part of the entire type information sequence, is equivalent to a sequence in which type information is arranged for divided data. The first analyzing unit 16 determines the end position of a numeric character string and the start position of a character string for each piece of divided data corresponding to a partial sequence.

Next, in operation 118, the first analyzing unit 16 determines the degree of matching of the end position of a numeric character string and the start position of a character string (or the start position of a numeric character string and the end position of a character string) among individual pieces of divided data. The degree of matching represents a ratio at which sequences of type information in individual ones of the divided partial sequences match each other, for example. An example of the degree of matching is a ratio of the number of pieces of divided data among which the end position of a numeric character string and the start position of a character string (or the start position of a numeric character string and the end position of a character string) correspond to each other to the total number of pieces of divided data. That is, the larger the number of pieces of divided data whose end position of a numeric character string and start position of a character string (or the start position of a numeric character string and the end position of a character string) are the same, the higher the degree of matching.

Next, in operation 120, the first analyzing unit 16 determines whether the degree of matching determined in operation 118 is equal to or larger than a predetermined threshold. The predetermined threshold has a value of 80%, for example. More preferably, the predetermined threshold has a value of 90%. Still more preferably, the predetermined threshold is a value of 100% (exact match).

When the degree of matching is equal to or more than the threshold, the determination in operation 120 is affirmative, and the process proceeds to operation 122. In operation 122, the first analyzing unit 16 sets a length (the number of characters), which is a result obtained by dividing the entire length by the divisor being processed set in operation 112, as a temporary record length. Next, in operation 124, the first analyzing unit 16 regards the length (the number of characters), which is a result obtained by dividing the entire length by the divisor being processed set in operation 112, as the entire length, and continues processing. That is, in operation 124, the first analyzing unit 16 regards the temporary record length set in operation 122 as the entire length. This processing is equivalent to changing the data being processed from the fixed-length data 12 used in operation 110 to data of the temporary record length set in operation 122 and continuing processing. Thereby, processing is repeated for divisors of the divisor being processed. By processing of operation 124, when a record which has been set to have a temporary record length includes a plurality of records, the record is able to be divided by a length (the number of characters) of the result of dividing the record by a divisor of the temporary record length. Note that when all the divisors to be processed are set sequentially as a divisor being processed in operation 112 and processing is repeated, processing of operation 124 will be performed in operation 112 and thereafter, and therefore the processing of operation 124 may be skipped.

Otherwise, if the determination of operation 120 is negative, the first analyzing unit 16, in operation 126, determines whether processing has been completed for all the divisors. If the determination of operation 126 is negative, the first analyzing unit 16 returns to operation 112 and continues processing from operation 112. Otherwise, if the determination of operation 126 is affirmative, the first analyzing unit 16 proceeds to operation 128. Next, in operation 128, the first analyzing unit 16 decides that a temporary record length finally set in operation 122 is one record length of data of a plurality of items included in the fixed-length data 12.

In a way as described above, one record length for the fixed-length data 12 is assumed.

Note that, in operation 128, at least one position of the start position and end position of the decided one record length may be output as break information indicating the break position of a record of the fixed-length data.

As an example of assuming one record length, FIG. 5A, FIG. 5B, FIG. 5C, FIG. 6A, FIG. 6B, FIG. 7A and FIG. 7B illustrate a process of dividing the fixed-length data 12 in accordance with every divisor of the length of the entirety of the fixed-length data 12 and assuming one record length. FIG. 5A illustrates the fixed-length data 12 of 30 characters as an example of the fixed-length data 12. Accordingly, the entirety of the fixed-length-data 12 has a length of 30, and the divisors thereof are 30, 15, 10, 6, 5, 3, 2 and 1. Note that the results of dividing the entire length by individual divisors are 1, 2, 3, 5, 6, 10, 15 and 30.

FIG. 5B illustrates divided data 12A-1 and 12A-2 into which the fixed-length data 12 is divided by the divisor of 15. FIG. 5C illustrates partial sequences 12a-1 and 12a-2 in which, for the divided data 12A-1 and 12A-2, the character at the end position of a numeric character string is replaced with "n" and the character at the start position of a character string is replaced with "s". As illustrated in FIG. 5C, the end position of a numeric character string and the start position of a character string do not match between the partial sequences 12a-1 and 12a-2. That is, only the kind of a character corresponding to the first character of divided data matches and those at other positions do not match between them. This indicates that the degree of matching of the end position of a numeric character string and the start position of a character string is approximately "0" when the record length is determined by using the divisor of 15.

FIG. 6A illustrates divided data 12B-1, 12B-2 and 12B-3 into which the fixed-length data 12 is divided by the divisor of 10. FIG. 6B illustrates partial sequences 12b-1, 12b-2 and 12b-3 in which, for the divided data 12B-1, 12B-2 and 12B-3, the character at the end position of a numeric character string is replaced with "n" and the character at the start position of a character string is replaced with "s". As illustrated in FIG. 6B, the end position of a numeric character string and the start position of a character string substantially match among the partial sequences 12b-1 to 12b-3. That is, only the kind of a character corresponding to the first character of divided data does not match and those of other characters match among these sequences. This indicates that the degree of matching of the end position of a numeric character string and the start position of a character string exceeds 90% and is desirable when the record length is determined by using the divisor of 10.

Then, a description will be given of an example in which, with respect to the divisor of 10, the divisors thereof are 5 and 2, of which the divisor of 5 is used for a division of the fixed-length data 12.

FIG. 7A illustrates divided data 12C-1, 12C-2, 12C-3, 12C-4, 12C-5 and 12C-6 into which the fixed-length data 12 is divided by the divisor of 5. FIG. 7B illustrates partial sequences 12c-1 to 12c-6 corresponding to divided data 12C-1 to 12C-6, respectively. As illustrated in FIG. 7B, the end position of a numeric character string and the start position of a character string do not match among the partial sequences 12c-1 to 12c-6.

Form the above, it is assumed that the record length of the fixed-length data 12 of 30 characters illustrated by way of example in FIG. 5A is "10".

Figure 8:
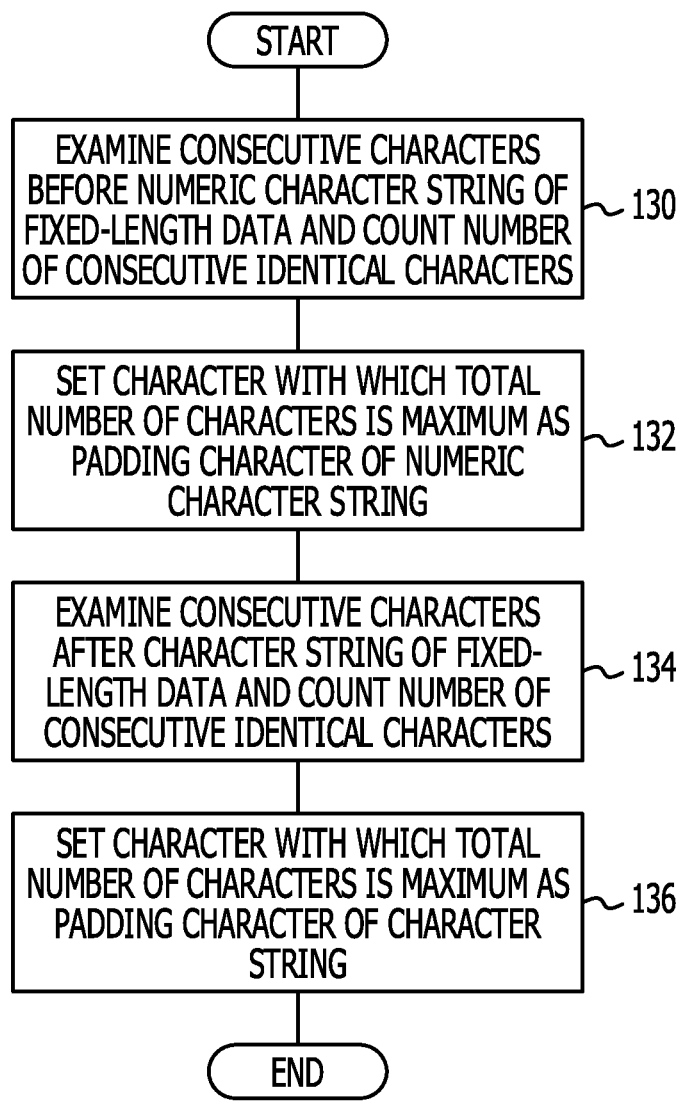
FIG. 8 is a flowchart illustrating an example flow of processing in a second analyzing unit.

In a second analysis process of operation 104 performed by the second analyzing unit 20 of the item analyzing unit 18, a processing routine of FIG. 8 is executed. In this embodiment, by way of example, padding characters are assumed from the fixed-length data having a plurality of items each having a fixed length and type. Note that, in this embodiment, a description will be given of the case where consecutive padding characters of a numeric character string are provided before the numeric character string and consecutive padding characters of a character string are provided after the character string. However, the techniques of this disclosure are not intended to be limited to the case consecutive padding characters of a numeric character string are provided before the numeric character string and consecutive padding characters of a character string are provided after the character string. For example, the techniques of this disclosure may be applied to the case where consecutive padding characters are provided either before or after a numeric character string and either before and after a character string, by counting the number of consecutive identical characters before or after a numeric character string and before or after a character string as with a method described hereinafter.

If consecutive identical characters are provided before (or after) a numeric character string, the second analyzing unit 20 determines that the consecutive characters are padding characters of the numeric character string. Also, if consecutive identical characters are provided after (or before) a character string, the second analyzing unit 20 determines that the consecutive characters are padding characters of the character string (character type item). An example in which padding characters are assumed in the second analyzing unit 20 as such will be described in detail.

In operation 130 of FIG. 8, the second analyzing unit 20 examines consecutive characters before a numeric character string of the fixed-length data 12 acquired in operation 100, and counts the number of consecutive identical characters. Next, in operation 132, the second analyzing unit 20 sets a character with which the total number of characters is at the maximum, among identical characters counted in operation 130, as a padding character of the numeric character string. Next, in operation 134, the second analyzing unit 20 also examines consecutive characters after a character string of the fixed-length data 12, and counts the number of consecutive identical characters. Next, in operation 136, the second analyzing unit 20 sets a character with which the total number of characters is at the maximum, among identical characters counted in operation 134, as a padding character of the character string.

In a way as mentioned above, padding characters in the fixed-length data 12 are assumed.

Figure 9:
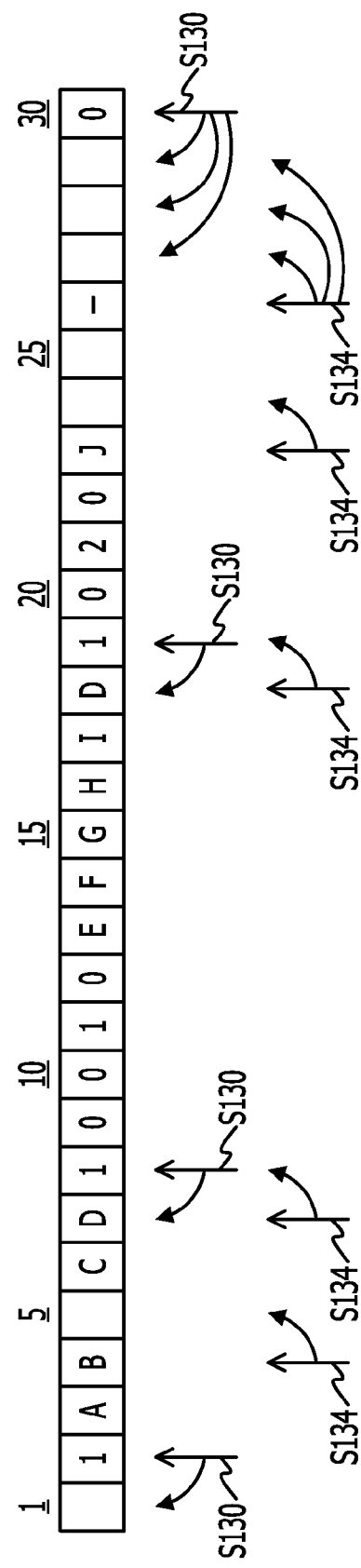
FIG. 9 is an explanatory illustration of a process of assuming a padding character.

FIG. 9 illustrates an example process of assuming a padding character. First, the second analyzing unit 20 searches for characters which are arranged in a consecutive manner before numeric character strings (operation 130). In the example of FIG. 9, the initial numbers of the numeric character strings for searching for the characters are "1" of the 2nd character, "1" of the 8th character, "1" of the 19th character, and "0" of the 30th character. Characters arranged in a consecutive manner before these numeric character strings are to be searched for. The process is denoted by numeral characters S130. That is, the second analyzing unit 20 examines characters which are arranged before numeric character strings. If identical characters are arranged in a consecutive manner, the second analyzing unit 20 counts the number of consecutive identical characters. As a result of search, one character of "blank", one character of "D", one character of "D" and three characters of "blank" are found. A character with which the total number of characters is at the maximum in the result of search is regarded as a padding character. Accordingly, in the example of FIG. 9, "blank" is set as the padding character of the numeric character string.

Then, the second analyzing unit 20 searches for consecutive characters after character strings (operation 134). In the example of FIG. 9, the last characters of character strings for searching for the characters are "B" of the 4th character, "D" of the 7th character, "D" of the 18th character, "3" of the 23th character and "-" of the 26th character. The second analyzing unit 20 searches for characters arranged in a consecutive manner after these character strings. The process is denoted by numeral characters S134. That is, the second analyzing unit 20 examines characters which are arranged after character strings. If identical characters are arranged in a consecutive manner, the second analyzing unit 20 counts the number of consecutive identical characters. As a result of search, one character of "blank", one character of "1", one character of "1", two characters of "blank" and three characters of "blank" are found. The second analyzing unit 20A regards a character with which the total number of characters is at the maximum in the result of search as a padding character. Accordingly, in the example of FIG. 9, "blank" is set as the padding character of the character string.

Next, in a third analysis process of operation 106 performed by the third analyzing unit 22 of the item analyzing unit 18, the breaks of items in the fixed-length data 12 is assumed using one record length assumed in the first analyzing unit 16 and the padding characters assumed in the second analyzing unit 20. The third analyzing unit 22 assumes the breaks of items using the first assuming method and the second assuming method.

The first assuming method determines the kind of a character at every position in a record, and assumes the boundary between characters of different kinds which is common to all the records as the break of an item. That is, based on information on the fixed-length data and information on one record length, the first assuming method determines the kind of a character for every character position in a record and finds the breaks of items, and determines the range of one item. For example, viewing characters of each record vertically (in a direction perpendicular to the sequence direction of records), the first assuming method determines the kinds of characters, thereby finding the breaks of items, and determining the range of one item.

Figure 10:
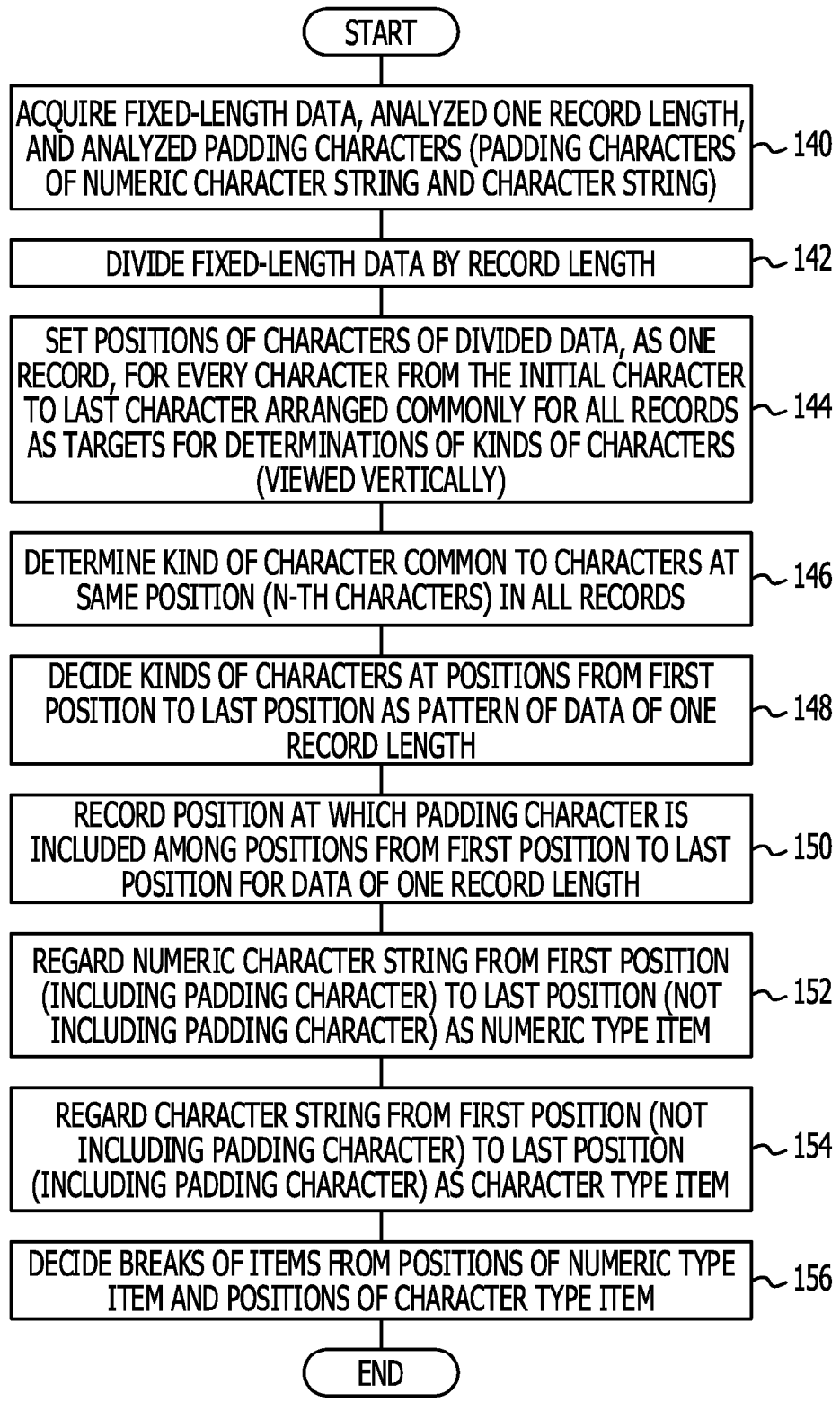
FIG. 10 is a flowchart illustrating an example flow of first assuming processing in a third analyzing unit.

More particularly, a processing routine of FIG. 10 is executed in the first assuming method in the third analyzing unit 22. Note that, in this embodiment, the case where the lengths of all the records match each other will be described. The case where padding characters may be arranged in a consecutive manner before (or after) a numeric character string, or padding characters may be arranged in a consecutive manner after (or before) a character string will also be described. The length of one record, padding characters of a numeric character string, and padding characters of a character string are to be assumed in advance.

In operation 140 of FIG. 10, the third analyzing unit 22 acquires information on the fixed-length data 12 acquired in operation 100, one record length assumed in operation 102, and padding characters assumed in operation 104. Next, in operation 142, the third analyzing unit 22 divides the fixed-length data 12 by one record length assumed in operation 102, and regards the divided data obtained by the division as one record. Next, in operation 144, the third analyzing unit 22 sets the positions of characters of the divided data regarded as one record, one by one from the initial character to the last character, uniformly for all the records, as targets for determinations of the kinds of characters. The processing of operation 144 is equivalent to referring to characters vertically when records are arranged in such a manner that the positions of characters of records are aligned with each other in a vertical direction.

Next, in operation 146, the third analyzing unit 22 determines the kind of character common to characters at the same position (nth) in all the records. Note that, in operation 146, when a character of a character string and a character of a numeric character string are mixed, the characters are preferably regarded as characters of a character string. Next, in operation 148, the third analyzing unit 22 decides the kinds of characters at positions from the first position to the last position as a pattern of data of one record length. Next, in operation 150, when there is a padding character at a position from the first position to the last position for the data of one record length, the third analyzing unit 22 records a position at which the padding character exists. Next, in operation 152, the third analyzing unit 22 sets positions of a numeric character string, from the first position to the last position, as positions of a numeric type item. Note that, in some cases, a padding character is included at the first position of a numeric character string. A padding character is not included at the last position of a numeric character string. Next, in operation 154, the third analyzing unit 22 sets positions of a character string, from the first position to the last position, as positions of a character type item. Note that a padding character is not included at the first position of a character string. In some cases, a padding character is included at the last position of a character string. Next, in operation 156, the third analyzing unit 22 decides breaks of items using the positions of a numeric type item and the positions of a character type item set in operation 152 and operation 154.

Note that when the break of an item is decided, it is preferable that a character string has a priority over a numeric character string. For example, data from the first position to the last position based on positions of a numeric type item are given as the numeric type item, and the number of characters from the first position to the last position is assumed as the data length of the numeric type item. Also, data from the first position to the last position based on positions of a character type item are given as the character type item, and the number of characters from the first position to the last position is assumed as the data length of the character type item. If a character string has a priority over a numeric character string when the break of an item is decided, the presence or absence of a padding character effectively functions in cases where a character type item is assumed. For example, when a padding character is not included at the top of a character string and a padding character is included at the end of the character string, a portion of the boundary between the presence and absence of a padding character is assumed to be a break of an item.

In a way as mentioned above, the third analyzing unit 22 assumes break positions of items in the fixed-length data 12.

FIG. 11A and FIG. 11B illustrate an example process of assuming an item. FIG. 11A illustrates divided data 12B-1, 12B-2 and 12B-3 obtained by dividing the fixed-length data 12 by the divisor of 10 (also see FIG. 6A). FIG. 11B illustrates a partial sequence 12D in which the character types at all the positions from the first position to the last position are decided as a pattern of data of one record length (operation 148). FIG. 11B illustrates a partial sequence 12E in which characters of "P" are stored at positions of a padding character. The positions have been recorded when the padding character has existed at a position among positions from the first position to the last position in data of one record length (operation 150).

The assumption of items using the fixed-length data 12 illustrated in FIG. 11A and FIG. 11B allows the following result to be obtained: data includes a numeric type item of two characters, a character type item of three characters, a character type item of three characters, and a numeric type item of two characters, which are arranged in a consecutive manner.

In this way, each record may be determined using the fixed-length data and the assumed one record length. Determining the kind of character common to characters at the same position in all the records (the kind of character at the position of characters when records are viewed vertically) allows the breaks of items to be identified and allows the range of one item to be set.

Note that although, in this embodiment, the description has been given on the assumption that a numeric type item and a character type item exist, the techniques of this disclosure are not limited to a numeric type item and a character type item. For example, the techniques of this disclosure may be applied to items such as an item including alphabet and a mark character if they are able to be separated by the kind of character.

Then, the second assuming method in the third analyzing unit 22 assumes the break position of an item from a predefined sequence of kinds of characters. For example, the second assuming method determines a pattern which matches a sequence of numbers or the degree of matching is equal to or larger than a predetermined threshold, and when the pattern appears in all the records, the second assuming method assumes the pattern as an item and assumes the position of either before or after the pattern as the break position of the item. That is, the second assuming method determine items of a record using a pattern which is able to be identified by the regular expression, thereby setting the break positions of items and assuming one item.

In this embodiment, the case where there exist a character type item representing the date in a regular expression (e.g., a date-type item of MMDD format), other character type items, and a numeric type item will be described. Note that an assumption using a regular expression is not limited to the character type item representing the date. For example, for any item whose values are capable of being represented in an arbitrary character string pattern, the break of the item may be assumed in a similar way.

Figure 12:
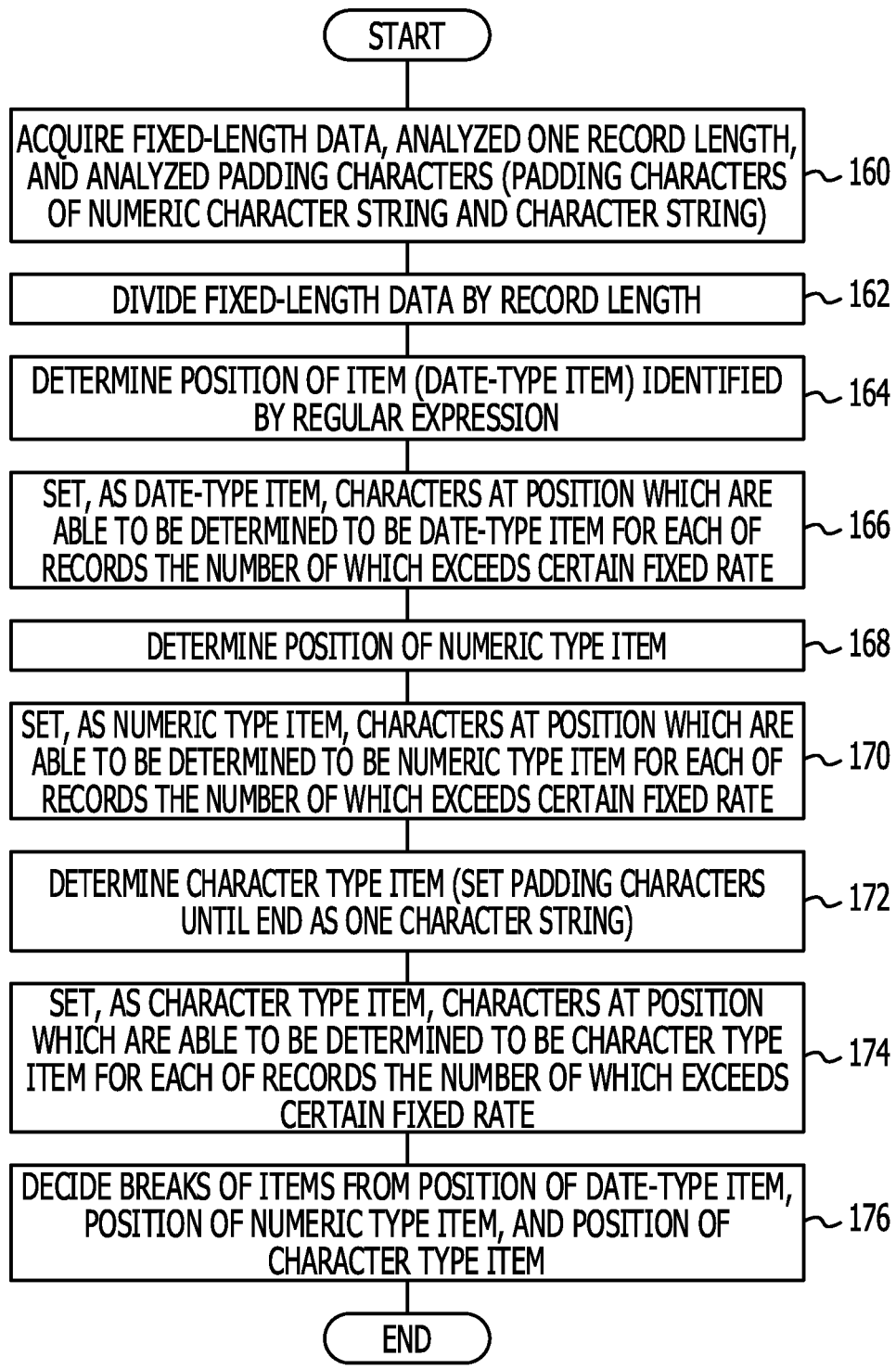
FIG. 12 is a flowchart illustrating an example flow of second assuming processing in the third analyzing unit.

More particularly, a processing routine of FIG. 12 is executed in the second assuming method in the third analyzing unit 22. Note that, in this embodiment, the case where the lengths of all the records match each other will be described. The case where padding characters may be arranged in a consecutive manner before (or after) a numeric character string, or padding characters may be arranged in a consecutive manner after (or before) a character string will also be described. The length of one record, padding characters of a numeric character string, and padding characters of a character string are to be assumed in advance.

In operation 160 of FIG. 12, the third analyzing unit 22 acquires information on the fixed-length data 12, the assumed one record length, and padding characters, like in operation 140 of FIG. 10. Next, in operation 162, the third analyzing unit 22 divides the fixed-length data 12 by the assumed one record length, and regards the divided data obtained by the division as one record, like in operation 142 of FIG. 10.

Next, in operation 164, the third analyzing unit 22 determines the position of an item identified by the regular expression (e.g., a character type item representing the date, an example thereof is a date-type item of MMDD format) for the divided data regarded as one record. In the date-type item of MMDD format, characters representing a 2-digit number of any one of "01" to "12" are provided at the position of MM. Also, characters representing a 2-digit number of any one of "01" to "31" are provided at the position of DD.

Next, in operation 166, the third analyzing unit 22 sets, as a date-type item, characters at a position which are able to be determined to be a character type item representing the date for all the records or each of records the number of which exceeds a certain fixed rate. The certain fixed rate in this case is a predetermined threshold. The predetermined threshold has a value of 80%, for example. Preferably, the predetermined threshold has a value of 90%. More preferably, the predetermined threshold is a value of 100%, which is equivalent to the commonality to all the records.

Next, in operation 168, the third analyzing unit 22 determines the position of a numeric type item for characters other than the date-type item set in operation 166. Next, in operation 170, the third analyzing unit 22 sets, as a numeric type item, characters at a position which are able to be determined to be a numeric type item for all the records or each of records the number of which exceeds a certain fixed rate. The certain fixed rate in this case is a predetermined threshold. The predetermined threshold has a value of 80%, for example. Preferably, the predetermined threshold has a value of 90%. More preferably, the predetermined threshold is a value of 100%, which is equivalent to the commonality to all the records.

Next, in operation 172, the third analyzing unit 22 determines a character type item. Note that, in this embodiment, the case where characters until an end of padding characters is set as one character string will be described. Next, in operation 174, the third analyzing unit 22 sets, as a character type item, characters at a position which are able to be determined to be a character type item for each of records the number of which exceeds a certain fixed rate. The certain fixed rate in this case is a predetermined threshold. The predetermined threshold has a value of 80%, for example. Preferably, the predetermined threshold has a value of 90%. More preferably, the predetermined threshold is a value of 100%, which is equivalent to the commonality to all the records.

Next, in operation 176, the third analyzing unit 22 decides breaks of items using the position of the date-type item, the position of the numeric type item, and the position of the character type item set in operations 166, 170 and 174.

In a way as mentioned above, the third analyzing unit 22 assumes break positions of items in the fixed-length data 12.

Figure 13A:
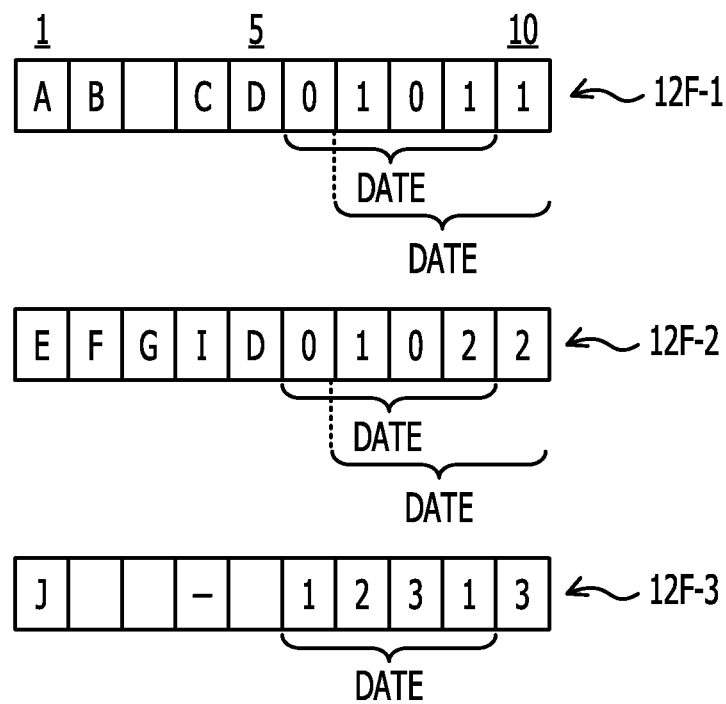
FIG. 13A and FIG. 13B are explanatory illustrations for the second assuming processing in the third analyzing unit.
Figure 13B:
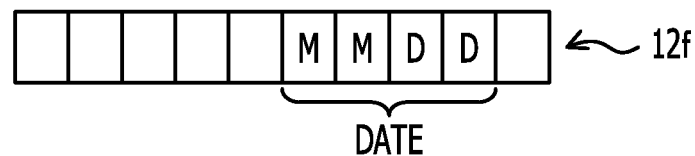
Figure 15A:
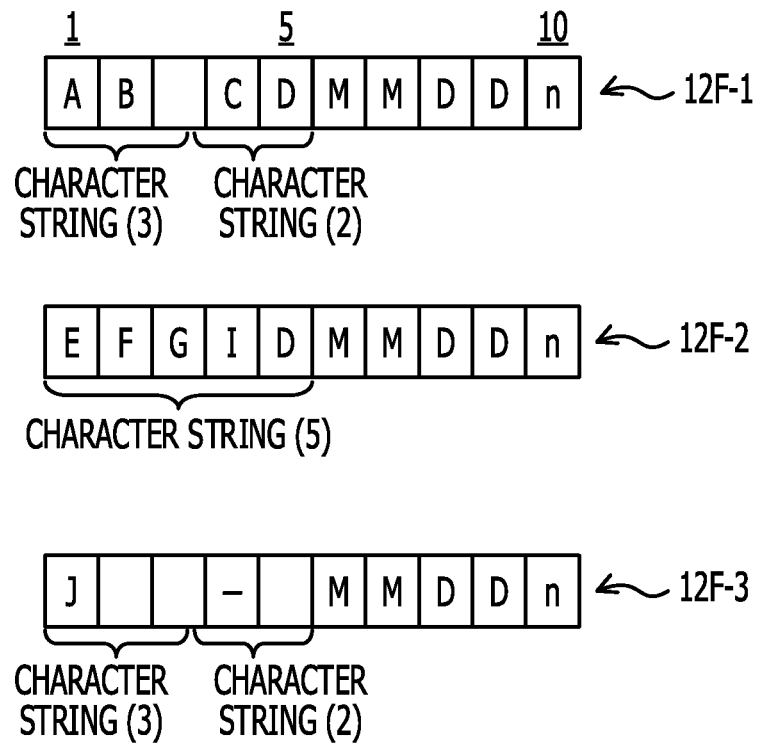
FIG. 15A and FIG. 15B are explanatory illustrations for the second assuming processing in the third analyzing unit.
Figure 15B:
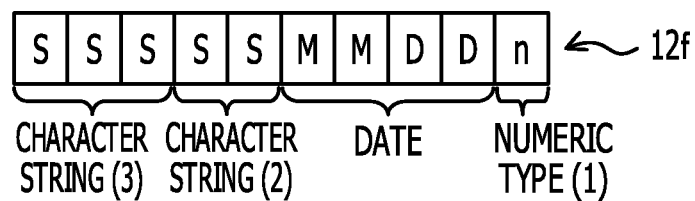

FIG. 13A, FIG. 13B, FIG. 14A, FIG. 14B, FIG. 15A and FIG. 15B illustrate an example process of assuming an item by the second assuming method. FIG. 13A and FIG. 13B illustrate a process of assuming a date-type item. FIG. 14A and FIG. 14B illustrate a process of assuming a numeric type item. FIG. 15A and FIG. 15B illustrate a process of assuming a character type item. FIG. 13A illustrates divided data 12F-1, 12F-2 and 12F-3 obtained by dividing the fixed-length data 12 of an entire length of 30 characters including a character type item representing the date by the divisor of 10. FIG. 13B illustrates a partial sequence 12$f$ in which the kinds of characters of a date-type item representing the date are set as a pattern of data of one record length.

As illustrated in FIG. 13A, in the divided data 12F-1, a character string of from a 6th character to a 9th character and a character string of from a 7th character to a 10th character correspond to character type items representing the date. In the divided data 12F-2, a character string of from the 6th character to the 9th character and a character string of from the 7th character to the 10th character correspond to character type items representing the date. In contrast, in the divided data 12F-3, only a character string of from the 6th character to the 9th character corresponds to a character type item representing the date. From the correspondences of the divided data 12F-1 to 12F-3, as illustrated as a pattern of data of one record length in FIG. 13B, the position of a character string of from the 6th character to the 9th character may be assumed to correspond to the position of a date-type item, and the partial sequence 12$f$ in which the kinds of characters are set may be assumed.

Then, a numeric type item is assumed for characters remaining other than the date-type item. FIG. 14A illustrates divided data 12F-1, 12F-2 and 12F-3 each including characters other than the date-type item. FIG. 14B illustrates a partial sequence 12$f$ in which the kinds of characters of a date-type item and a numeric type item are set as a pattern of data of one record length.

As illustrated in FIG. 14A, in the divided data 12F-1 to 12F-3, a 10th character corresponds to a numeric type item. Accordingly, as illustrated as a pattern of data of one record length in FIG. 14B, the position of the 10th character may be assumed to correspond to the position of a numeric type item, and the partial sequence 12$f$ in which the kinds of characters are set may be assumed.

Then, the third analyzing unit 22 assumes a character type item for characters remaining other than the date-type item and the numeric type item. FIG. 15A and FIG. 15B illustrate a process of assuming a character type item by way of example. FIG. 15A illustrates the divided data 12F-1, 12F-2 and 12F-3 each including characters other than the date-type item and the numeric type item. FIG. 15B illustrates a partial sequence 12f in which the kinds of characters of a date-type item, a numeric type item and a character type item are set as a pattern of data of one record length.

As illustrated in FIG. 15A, in the divided data 12F-1, a character string of from a 1st character to a 3rd character and a character string of from a 4th character to a 5th character correspond to character type items. In the divided data 12F-2, a character string of from a 1st character to a 5th character corresponds to a character type item. In the divided data 12F-3, a character string of from a 1st character to a 3rd character and a character string of from a 4th character to a 5th character correspond to character type items. From the correspondences of the divided data 12F-1 to 12F-3, as illustrated in FIG. 15B, the partial sequence 12f in which the kinds of characters are set may be assumed. That is, as a pattern of data of one record length, the positions of the character string of from the 1st character to the 3rd character and the character string of from the 4th character to the 5th character may be assumed to correspond to the positions of character type items, and the partial sequence 12f in which the kinds of characters are set may be assumed.

Accordingly, as illustrated in FIG. 15B, the assumption of items allows the following result to be obtained: data includes a character type item of three characters, a character type item of two characters, a date-type item of four characters, and a numeric type item of one character, which are arranged in a consecutive manner. In this way, each record is determined using the fixed-length data and the assumed one record length.

Then, with reference to FIG. 16, a dividing process of the fixed-length data 12 implemented by the data dividing device 13 of the data analysis system 10 will be described.

Figure 16:
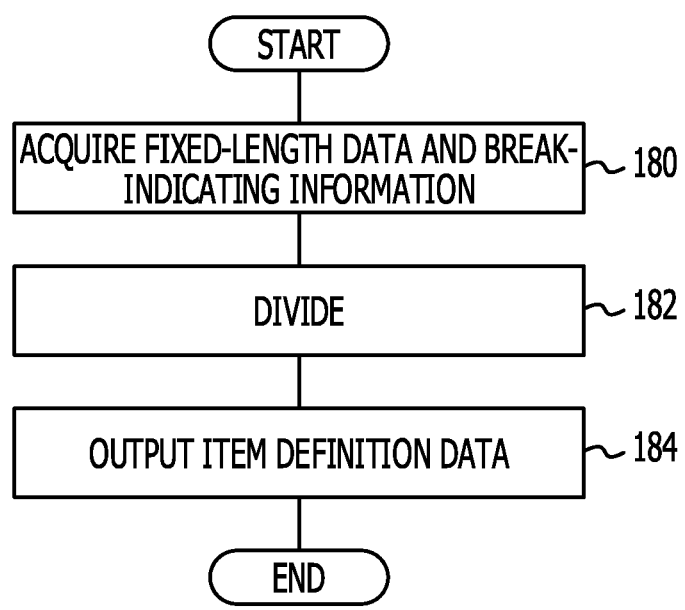
FIG. 16 is a flowchart illustrating a flow of a data dividing process.

In the dividing process performed by the data dividing device 13, a processing routine illustrated in FIG. 16 is executed. First, in operation 180, the dividing unit 26 of the data dividing device 13 acquires the fixed-length data 12, which is a subject of the data analysis specified by a user's instruction, and the break-indicating information analyzed in the data analysis device 11. Next, in operation 182, the dividing unit 26 divides the acquired fixed-length data 12 for every item using the analyzed break-indicating information. Next, in operation 184, the dividing unit 26 generates and outputs item definition data in which the kinds of characters and the number of characters corresponding to an item are associated with data divided for each item using the break-indicating information.

Note that although, in this embodiment, an aspect in which the data dividing device 13 divides the fixed-length data 12 for every item has been described, the techniques of this disclosure are not intended to be limited to the dividing of the fixed-length data 12 for every item. For example, the fixed-length data 12 may be output in association with the break-indicating information analyzed in the data analysis device 11, as a fixed-length data file.

Moreover, an example in which a data analysis device and a data dividing device are implemented by a computer has been described above. However, it will be understood that the techniques of the present disclosure are not intended to be limited to these configurations and various kinds of improvement and changes may be made without departing from the scope of gist described above.

Moreover, although an aspect in which the programs are stored (installed) in advance in the storage unit has been described, the techniques of this disclosure are not intended to be limited to this. For example, the data analysis program or data division program in the techniques of this disclosure may also be provided in the form in which it is recorded on a recording media, such as a CD-ROM, DVD-ROM or the like.

All the documents, patent applications, and technical standards described herein are incorporated herein by reference to the same extent as if each individual document, application or standard was specifically and individually indicated to be incorporated herein by reference.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A device comprising:
a memory configured to store a program; and
a processor coupled to the memory and configured to execute a process based on the program, the process including:
for input data made of a combination of pieces of unit data and including a plurality of consecutive records each including data of a plurality of items, when a sequence of type information indicating a kind of each piece of the unit data in the input data is divided into partial sequences each having a certain length, analyzing a break position of the records in the input data by determining, as a length of each of the records, the length of each of the partial sequences when sequences of type information in all the partial sequences correspond to each other.

2. The device according to claim 1, wherein the analyzing analyzes at least one of a start position and an end position of the partial sequence, as break information indicating a break position of the input data.

3. The device according to claim 2, wherein the analyzing analyzes a position which is at least one of the start position and the end position of the partial sequence and is at least one of a start position and an end position of consecutive pieces of the type information of an identical kind, as the break information indicating the break position of the input data.

4. The device according to claim 1, wherein the analyzing analyzes at least one of a start position and an end position of the partial sequence as break information if a degree of matching representing a ratio at which the sequences of type information in all the partial sequences match each other is equal to or more than a threshold.

5. The device according to claim 1, wherein the analyzing divides the input data with the unit data being set as data representing one character and with a number of characters obtained by dividing a total number of characters of the input data by a divisor thereof being set as the certain length.

6. The device according to claim 1, wherein the input data does not include a predetermined specific break information indicating a break of at least one of the data and the records.

7. The device according to claim 1, wherein the analyzing includes
analyzing a break position of each of the records, and
setting a sequence including part of the partial sequence as a basic pattern for the partial sequence, and analyzing, as item break information indicating a break position of each of the items, at least one position of a start position and an end position of the basic pattern when sequences of type information in individual ones of the divided partial sequences correspond to each other.

8. The device according to claim 1, wherein the unit data is data representing one character,
  the process further including:
  analyzing a break position of each of the records,
  analyzing consecutive identical characters as padding characters for the input data corresponding to the partial sequences, and
  analyzing a start position or an end position of the consecutive characters analyzed as the padding characters, as item break information.

9. The device according to claim 8, wherein the analyzing of the consecutive characters as padding characters analyzes, as the padding characters, characters a number of which exceeds a predetermined threshold, the characters being included in the input data.

10. The device according to claim 1, wherein the data of a plurality of items is text data including data representing a character and data representing a number.

11. The device according to claim 1, wherein the analyzing determines a boundary position between a character and a number as item break information indicating a break position of the items.

12. The device according to claim 1, wherein the analyzing determines a boundary position between presence and absence of the padding characters as item break information indicating a break position of the items when characters a number of which exceeds a predetermined threshold, the characters being included in the input data, are set as the padding characters.

13. The device according to claim 1, the process further including:
  dividing the input data into data corresponding to a plurality of items, based on information indicating the analyzed break position.

14. A method of processing data, the method comprising:
  for input data made of a combination of pieces of unit data and including a plurality of consecutive records each including data of a plurality of items, when a sequence of type information indicating a kind of each piece of the unit data in the input data is divided into partial sequences each having a certain length, analyzing a break position of the records in the input data by determining, as a length of each of the records, the length of each of the partial sequences when sequences of type information in all the partial sequences correspond to each other.

15. The method according to claim 14, further comprising:
  dividing the input data into data corresponding to a plurality of items, based on information indicating the analyzed break position.

16. A computer-readable recording medium storing a program for causing an apparatus to execute a process, the process comprising:
  for input data made of a combination of pieces of unit data and including a plurality of consecutive records each including data of a plurality of items, when a sequence of type information indicating a kind of each piece of the unit data in the input data is divided into partial sequences each having a certain length, analyzing a break position of the records in the input data by determining, as a length of each of the records, the length of each of the partial sequences when sequences of type information in all the partial sequences correspond to each other.

17. The computer-readable recording medium according to claim 16, the process further comprising:
  dividing the input data into data corresponding to a plurality of items, based on information indicating the analyzed break position.

* * * * *